United States Patent
Vick et al.

(10) Patent No.: US 9,894,938 B2
(45) Date of Patent: Feb. 20, 2018

(54) E-CIGARETTE SMART PHONE ATTACHMENT

(71) Applicant: MagSOL Labs, Morton Grove, IL (US)

(72) Inventors: Ronald A. Vick, Morton Grove, IL (US); Robert Pozdal, Inverness, IL (US)

(73) Assignee: MagSOL Labs, Morton Grove, IL (US)

( * ) Notice: Subject to any disclaimer, the term of this patent is extended or adjusted under 35 U.S.C. 154(b) by 0 days.

(21) Appl. No.: 15/463,233

(22) Filed: Mar. 20, 2017

(65) Prior Publication Data

US 2017/0196270 A1    Jul. 13, 2017

Related U.S. Application Data

(60) Provisional application No. 62/356,724, filed on Jun. 30, 2016.

(51) Int. Cl.

| | |
|---|---|
| *H04B 1/38* | (2015.01) |
| *A24F 47/00* | (2006.01) |
| *H04M 1/02* | (2006.01) |
| *G06F 21/32* | (2013.01) |
| *H04M 1/21* | (2006.01) |
| *H02J 7/00* | (2006.01) |

(52) U.S. Cl.
CPC ............ *A24F 47/008* (2013.01); *G06F 21/32* (2013.01); *H04M 1/0254* (2013.01); *H04M 1/21* (2013.01); *H01M 2220/30* (2013.01); *H02J 7/0042* (2013.01)

(58) Field of Classification Search
None
See application file for complete search history.

(56) References Cited

U.S. PATENT DOCUMENTS

| | | | |
|---|---|---|---|
| 2016/0080535 A1* | 3/2016 | Stanimirovic | H04M 1/185 455/575.8 |
| 2016/0161459 A1 | 6/2016 | Rouse | |
| 2016/0363917 A1* | 12/2016 | Blackley | G05B 19/042 |
| 2016/0367927 A1* | 12/2016 | Blackley | B01D 39/08 |
| 2016/0371590 A1* | 12/2016 | Blackley | G06N 5/04 |
| 2017/0023235 A1 | 1/2017 | Ishikawa | |
| 2017/0135410 A1* | 5/2017 | Cameron | A24F 47/008 |

OTHER PUBLICATIONS

Jupiter: Website: https://store.vaporcade.com/collections/jupiter; 2017; US.

* cited by examiner

*Primary Examiner* — Mohammed Rachedine
(74) *Attorney, Agent, or Firm* — Boyle Fredrickson S.C.

(57) ABSTRACT

A cell phone module for a modular phone providing an e-cigarette functionality. As well as making use of the battery power of the cell phone or external swappable battery, the module provides a data interface with the cell phone to provide functions such as monitoring of e-cigarette use as an aid to smoking cessation.

22 Claims, 4 Drawing Sheets

E-CIGARETTE SMART PHONE ATTACHMENT

CROSS REFERENCE TO RELATED APPLICATION

This application claims the benefit of U.S. provisional application 62/356,724 filed Jun. 30, 2016 and hereby incorporated by reference.

BACKGROUND OF THE INVENTION

The present invention relates to cellular telephones and in particular to an e-cigarette attachment for a modular cellular telephone.

Current cellular telephones have adopted a modular construction allowing consumer-accessible replacement of the cell phone battery and customization of the cell phone functions, for example, by adding different modules, for example, including: camera modules, speaker modules, game controllers, pico projectors, laser pointers, medical devices, and the like. An, example of such phone is the Google ARA, which provides a skeletal framework having multiple sockets to receive replaceable modules, or Moto Z, which provides exposed contacts and magnets for module attachment. Both modular phone designs provide data connections and power connections exposed for module connection.

SUMMARY OF THE INVENTION

The present invention provides a cell phone module for a modular phone providing an e-cigarette functionality. As well as making use of the battery power of the cell phone or external swappable battery, the module provides a data interface with the cell phone to provide functions such as monitoring of e-cigarette use as an aid to smoking cessation.

One embodiment of the present invention provides a modular smart phone component providing e-cigarette functionality configured to electrically interconnect with a smart phone, comprising: a module having an exposed surface opposite a coupling surface releasably interconnecting with a frame of the smart phone; an interface socket providing electrical interconnection to a heater tank with a heater coil for heating a liquid for vaporization and enclosed by a replaceable mouthpiece; and a microcontroller executing a stored program stored in memory to: communicate with a processor of the smart phone; and control the electric power delivered from the smart phone to the heater coil.

It is thus a feature of at least one embodiment of the present invention to provide a compact, smart e-cigarette for occasional use by incorporating the e-cigarette components into a standard phone interface, thereby leveraging the power and processing capabilities of the smart phone without being tied to a special purpose or non-state-of-the-art phone.

The interface socket may be a threaded mechanical connection containing a two-terminal electrical connection.

It is thus a feature of at least one embodiment of the present invention to provide a phone-based e-cigarette compatible with a wide variety of e-cigarette hardware.

The replaceable mouthpiece may extend perpendicular from the exposed surface of the module.

It is thus a feature of at least one embodiment of the present invention to orient the vaporizer mouthpiece so as to permit camera functionality for novelty videos.

The interface sockets may be swiveled through a range of approximately 90 degrees or more about an axis perpendicular to an extension of the replaceable mouthpiece.

It is thus a feature of at least one embodiment of the present invention to provide a more comfortable fit of the mouthpiece within the user's mouth and desired angle of inhalation.

The module may he interconnected to the smart phone through a magnetic coupling.

It is thus a feature of at least one embodiment of the present invention to permit easy removal and replacement of the module from the smart phone, for example, to quickly conceal use.

The dimensions of the module may be commensurate with the dimensions of a broadest surface of a standard smart phone.

It is thus a feature of at least one embodiment of the present invention to provide a large surface for supporting different hardware features of the module including, for example, an interface socket, storage pocket, rear facing display, audio device, and/or rechargeable battery.

The interface socket may be on a same plane as a camera lens and the module may provide an, opening allowing the camera lens to extend through the opening.

It is thus a feature of at least one embodiment of the present invention to permit "vapor selfies" where the camera is positioned close to the mouthpiece in order to capture the user's image when they exhale.

The module may further comprise a sensor adapted to detect an identification of the liquid within the heater tank. The sensor may be a camera adapted to detect a machine readable optical label such as a QR code. The sensor may also be a physical sensor that can be adapted to detect a physical element embedded in the heater tank/mouthpiece such as a resistor or magnet.

It is thus a feature of at least one embodiment of the present invention to collect information regarding a user's e-liquid preferences, allow the user to rate different e-liquid flavors, and track consumption of particular e-liquid flavors.

The module may have a "lock out" feature to prevent operation or operation of certain features by unauthorized users, e.g., minors or children.

It is also a feature to shutdown, prevent, or limit usage of the vaporizer module, if the user of the smartphone is a child or a minor. This may be detected if the smartphone is in "child mode."

The microcontroller may communicate with a processor of the smart phone where the processer manages distribution of electrical power to the heater modular smart phone component. The microcontroller may also communicate with the smart phone's processor for other hardware functionality.

It is thus a feature of at least one embodiment of the present invention to utilize the smart phone's battery and power management system for powering the vaporizer module. Moreover, the vaporizer can utilize the smart phone's computing system for additional functionality such as internet connectivity.

The module may include a storage pocket sized to store the heater tank and mouthpiece when not coupled to the interface socket.

It is thus a feature of at least one embodiment of the present invention to allow the vaporizer to be used "on the go" while concealing the heater tank.

The module may further comprise an activation button delivering a signal to the microcontroller for activating power delivery to the heater coil. The activation button may be located on the screen of the smart phone.

It is thus a feature of at least one embodiment of the present invention to utilize the smart phone's larger touch screen for operating the vaporizer and providing a user friendly interface.

An alternative embodiment of the present invention provides a method of operating a modular vaporizer component comprising a module interconnecting with a smart phone; an, interface socket coupled to the module providing electrical interconnection to a heater tank with a heater coil and holding a liquid for vaporization and enclosed by a replaceable mouthpiece; and a microcontroller executing a stored program stored in memory to receive an activation signal and to control the electric power delivered to the heater coil in response to the activation signal, and comprising the steps of: electrically interconnecting the heater tank to the interface socket of the modular smart phone component; operating an application program of the modular smart phone component stored in a memory to: synchronize wireless communication between the modular smart phone component and the smart phone; and activate the heater coil for a duration of time.

It is thus a feature of at least one embodiment of the present invention to provide a program application communicating with the vaporizer to operate the vaporizer.

The method may further include operating the application program, to receive an identification of the liquid within the, heater tank.

It is thus a feature of at least one embodiment of the present invention to use the program application to track e-liquid consumption and to make user suggestions based upon prior use.

The method may further include operating the application program to detect when the heater tank is nearly empty to stop further activation of the heater coil.

It is thus a feature of at least one embodiment of the present invention to prevent "dry firing" of the heater coil, damaging the heater coil.

The method may further include operating the application program to track total time of activation of the heater coil or total amount of liquid consumed.

It is thus a feature of at least one embodiment of the present invention to monitor usage of the vaporizer to help users moderate or quit use.

The method may further include operating the application program to produce a graphical representation of track total time of activation of the heater coil or total amount of liquid consumed over time and display the graphical representation on a screen of the smart phone.

It is thus a feature of at least one embodiment of the present invention to provide positive reinforcement and tracking of the user's usage goals.

The duration of time the heater coil may be activated may be predetermined and limited over time.

It is thus a feature of at least one embodiment of the present invention to assist the user in moderation or quitting by limiting use or consumption.

The method may further include operating the application program to receive location data from the smart phone.

It is thus a feature of at least one embodiment of the present invention to display nearby users or e-liquid retailers.

These particular objects and advantages may apply to only some embodiments falling within the claims and thus do not define the scope of the invention.

DETAILED DESCRIPTION OF THE PREFERRED EMBODIMENT

Figure 1:
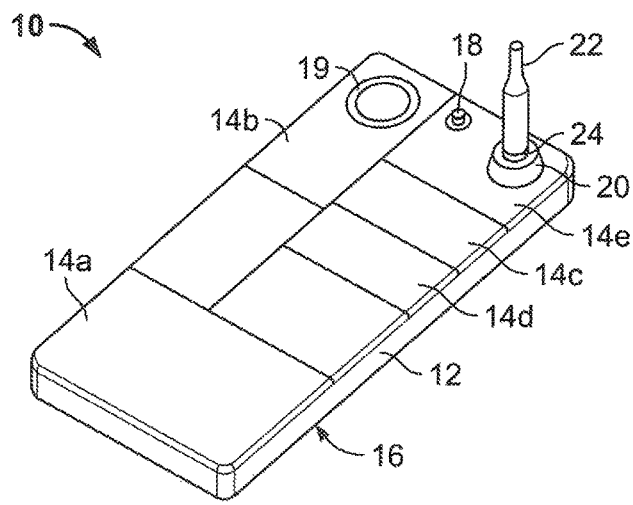
FIG. 1 is a perspective view of a modular cell phone showing one embodiment of the e-cigarette module of the present invention.

Referring now to FIG. 1, a modular cell phone 10 may include a frame 12 providing mechanical and electrical connection to one or more modules 14 that may be releasably connected to the frame 12 by a consumer. A phone suitable for this purpose is the Google ARA providing positions for six electronically releasable modules 14 or the Motorola Moto Z having a releasable back that electrically interconnects with the remainder of the phone both with respect to power structure and data lines. In one embodiment, the modules 14 may be exposed at the backside of the frame 12, the latter having dimensions comparable to that of a standard cell phone and supporting on its opposite side a touch screen 16 (not shown in FIG. 1) forming the front surface of the frame 12. Example modules may include a battery module 14a, a camera module 14b, speaker modules 14c, an E-paper display 14d, and an e-cigarette module 14e of the present invention. Generally either the frame 12 or the modules 14 may provide for a rear facing camera 19.

In one, embodiment, the e-cigarette module 14e may be positioned in an upper right-hand corner of the rear surface of the frame 12 although the e-cigarette module 14e is designed to be received in any comparable sized module position. The exposed rear face of the e-cigarette module 14e may provide an activation button 18 having an operator extending rearwardly to be actuated by the consumer pressing inward on the operator. Alternatively any of the phone's other buttons, including those implemented by the touch screen, may be used for such activation. The proximity of the e-cigarette module 14e to the camera 19 allows for a "vapor-cam" or "Vape-cam" feature in which the user records a short video of himself or herself in extreme close-up using the e-cigarette module 14e and then pulling back to reveal their full face and expression upon exhaling. These videos may be sent or exchanged by conventional social media video services such as Snapchat or Instagram.

The video timing and duration may be automatically controlled as well as an invocation of the video social media service based on, an activation of the e-cigarette module 14e.

The surface may also present an interface socket 20 providing mechanical and electrical interconnection to a replaceable mouthpiece/heater tank 22 holding a liquid for vaporization. The interface socket 20 may be a so-called "510", "Ego" or other similar standard socket such as provides a threaded mechanical connection containing a two-terminal electrical connection.

In one embodiment, as shown, the mouthpiece/heater tank 22 may extend perpendicularly from the rear face of the module 14e to be used in a horizontal orientation with the frame 12 held substantially vertically. The mouthpiece/heater tank 22 may be of a variety of designs including an atomizer, cartomizer or clearomizer commercially available from a variety of manufacturers.

Figure 2:
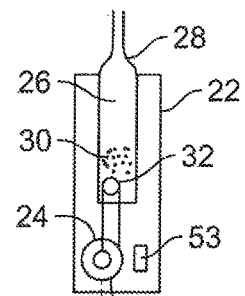
FIG. 2 is a block diagram of the functional elements of the cell phone and the interconnected e-cigarette module including an e-cigarette mouthpiece/heater tank.
Figure 2:
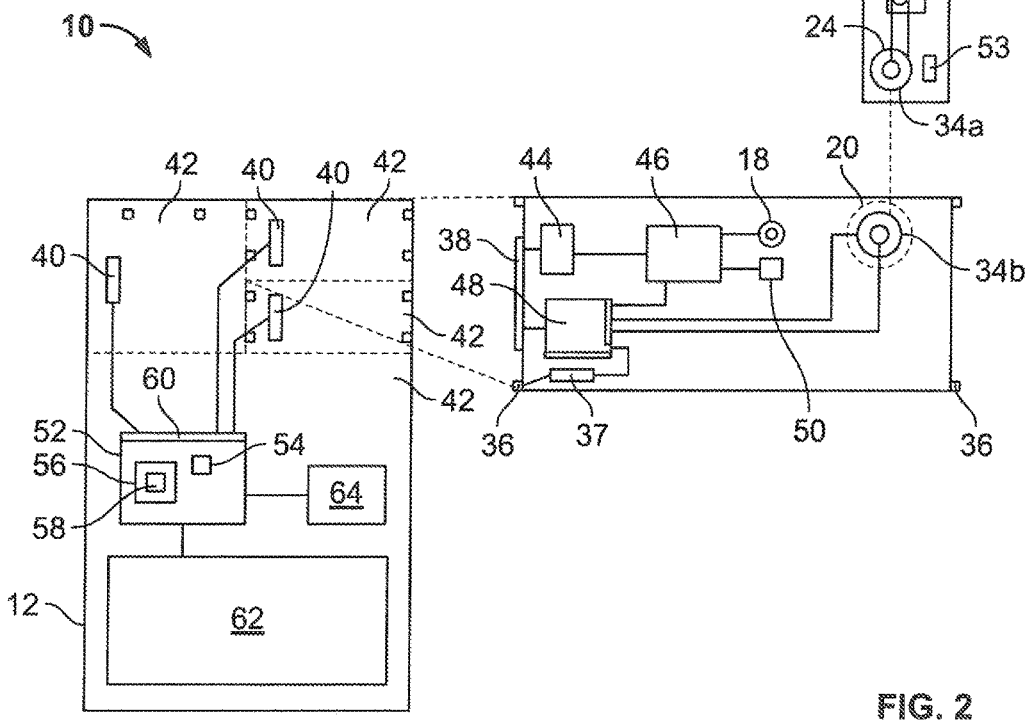

Referring now to FIG. 2, as is generally understood in the art, the mouthpiece/heater tank 22 may provide for a reservoir portion 26 open at one end at mouthpiece 28 and designed to contain a quantity of "e-liquid" 30, for example, including flavored glycerol or propylene glycol which will be vaporized by the mouthpiece/heater tank 22 to be inhaled through the mouthpiece 28 of the mouthpiece/heater tank 22. This vaporization is accomplished by a heater coil 32 held within the reservoir portion 26 opposite the mouthpiece 28, for example existing device like Moto Z and ARA phone, having a resistance from between about 0.002 ohms to five ohms. The heater coil 32 may connect to twin conductors of a first mating connector 34a of the mechanical/electrical connector 24 connectable to a second mating connector 34b at the interface socket 20 attached to the module 14e.

The e-cigarette module 14e may provide for the mechanical connection features 36 common with all modules 14 allowing it to attach to the frame 12. The mechanical connection features 36 may include an electric actuator 37 allowing the module 14 to be disengaged electronically under control of the smart phone 10. Alternatively, the connection between the module 14e and the smart phone 10 may be accomplished through magnets. In addition, the e-cigarette module 14e may provide an electrical connector 38 also common with all modules 14 allowing the e-cigarette module 14e to attach to corresponding electrical connectors 40 positioned at each of various modular sockets 42 within the frame 12 of the cell phone 10. Alternatively, instead of the electrical connector 38, the modules 14 could communicate with the cell phone 10 wirelessly, e.g., through a Bluetooth connection.

The electrical connector 38 may communicate, within the e-cigarette module 14e, with a communication protocol circuit 44 and a microcontroller 46, the latter controlling basic operating functions of the module 14e and the former communicating with the other components of the cell phone 10. In this regard, the microcontroller 46 may execute a stored program specific to the e-cigarette module 14e to provide functions as will be described below, for example, in receiving a signal from push button 18 and transferring that signal to other cell phone components.

The electrical connector 38 may also connect to a power management circuit 48 within the module 14e, the latter of which manages a connection to electrical power of the phone 10 and operates to distribute that electrical power within the e-cigarette module 14e and control the application of power to the heater coil 32 when the mouthpiece/heater tank 22 is connected. The power management circuit 48 may also provide for voltage regulation capabilities using either a boost or buck converter system to control the voltage and/or current to the various components of the e-cigarette module 14e and in particular to control the electrical power to the heater coil 32 and hence the amount of heat and the duration of the heat, produced by the heater coil 32.

Optionally, the controller module 14e may carry a built-in rechargeable battery supplementing the electrical power of the phone 10 and including a battery charger. The built-in rechargeable battery may be charged by the power of the phone 10. The battery allows the module 14e to be used when the module 14e is not connected to the phone 10, such as to provide a standalone vaporizer.

Optionally, the controller module 14e may include a sensor 50 that may read a corresponding identifier 53 on the mouthpiece/heater tank 22 for the purpose of identifying the mouthpiece/heater tank 22 and/or its, contents of e-liquid 30. For example, the sensor 50 may be an RFID reader reading an RFID tag as the identifier 53 or other similar identification device including a barcode scanner, electrical connector or the like. Alternatively, the identifier 53 may be a visible marking, or other machine readable optical label such as a QR code that may be read by the camera 19. The identifier 53 may also be a radio-frequency identification (RFID) tag or near field communication device containing electronically stored identification information that can be read by a RFID reader or reader of the phone 10.

Figure 7:
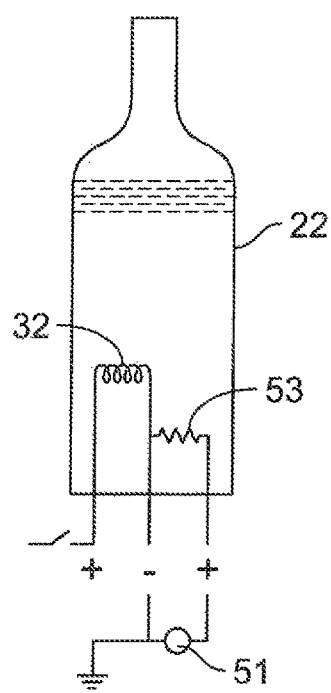
FIG. 7 is a schematic diagram of the mouthpiece/heater tank having a resistor element read by a detector of the e-cigarette module for identifying the mouthpiece/heater tank.

Referring to FIG. 7, in an alternative embodiment of the present invention, the sensor 50 may be a detector 51 capable of detecting a physical element 53 embedded within the mouthpiece/heater tank 22 and providing an identifying signal to identify the tank 22. For example, the physical element 53 may be a resistor element arranged in series with the heater coil 32 providing variable resistance that can be detected by the detector 51 of the controller module 14e, for example located within the interface socket 20. It is also contemplated that the physical element 53 may also be magnetic stripes, read only memory, pins encoded with binary numbers, and other known physical identifiers.

Optionally, the controller module 14e may also include a temperature sensor, rear facing visual display or audio device to be used in connection with operation of the mouthpiece/heater tank 22.

Referring still to FIG. 2, the frame 12 of the cell phone 10 may also include a main processor 52 having a processor element 54 communicating with a memory 56 holding one or more stored application programs 58 as will be described. The main processor 52 may include interface circuitry 60 operating analogously to communication protocol circuit 44 in the e-cigarette module 14e and providing the necessary electrical communication interface to each of the electrical connectors 40 in the different sockets 42. Interface circuitry 60 and communication protocol circuit 44 provide bi-directional communication between the main processor 52 and each of the microcontrollers 46 of the various modules 14.

The main processor 52 may also control electrical power provided to each of the electrical connectors 40 limiting or shutting off that power in circumstances where a proper module 14 has not been registered as will be described below. The main processor 52 receives power from the battery system 62 for this purpose including, for example, a lithium ion battery and battery regulation charging circuitry of a type known in the art.

Generally the frame 12 will also include additional circuitry providing various other built-in functionalities 64, for example, cell phone transceiver circuitry, GPS circuitry, touch screen interface circuitry for the cell phone touch screen 16 and the like. The memory 56 may also included general phone operating system (not shown), for example, implementing basic cell phone functions and application programs and controlling synchronization with the various modules 14. The phone operating system may, for example, also control mechanical release of the modules 14 by the activation of electric actuator 37, for example, using a memory wire actuator.

The use of e-cigarettes to help in smoking cessation is a benefit that may be undercut by difficulties in tracking actual e-cigarette and regular cigarette usage and in particular the amount of nicotine received a problem that is compounded by variations in nicotine found in different brands of e-liquid 30. in this regard, the present invention makes use of the capabilities of the cell phone 10 to provide logging, tracking, and reporting capabilities.

Figure 3:
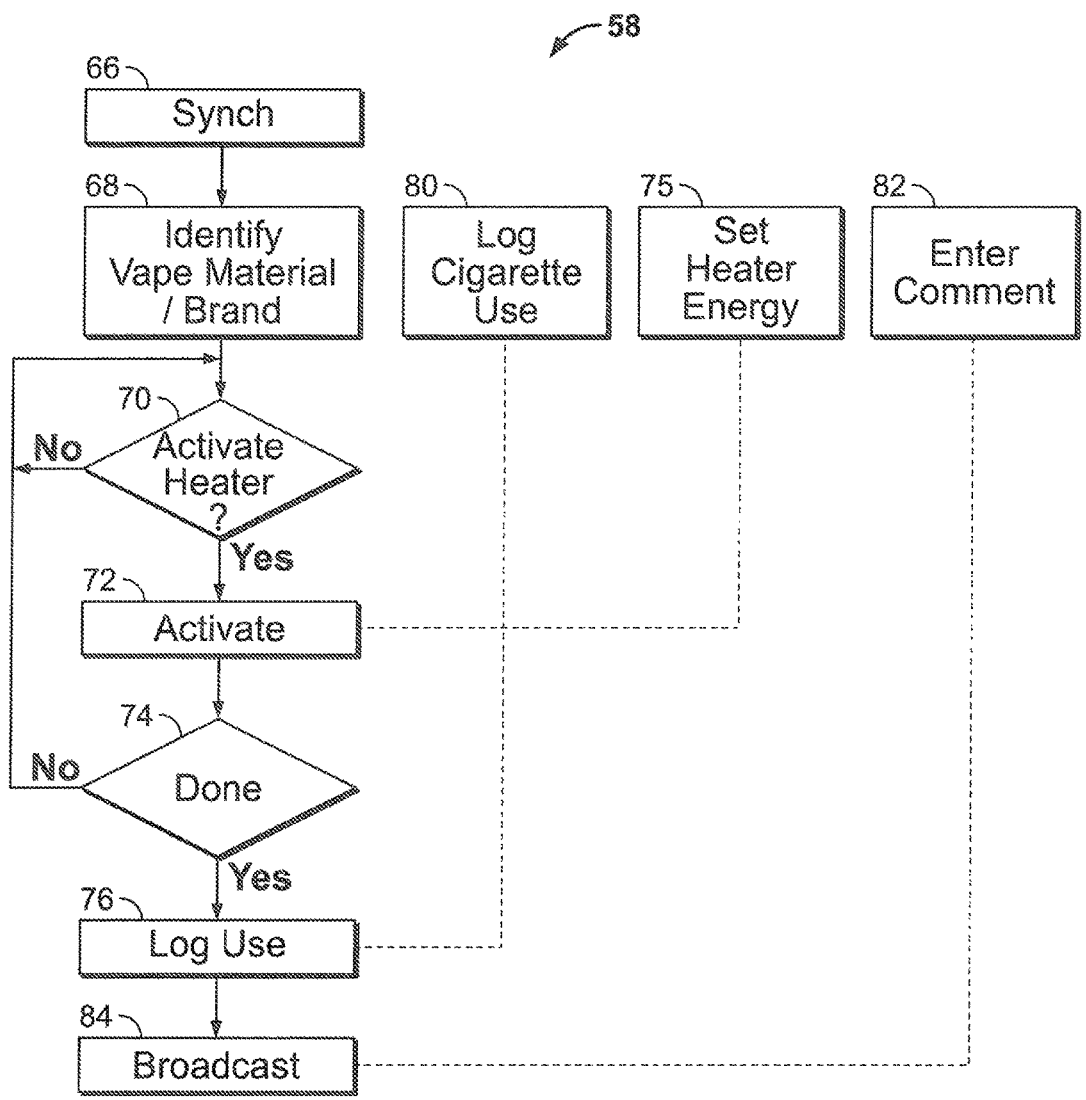
FIG. 3 is a flowchart of an application program operating in the cell phone and/or e-cigarette module to provide usage tracking and communication with other users, and support group members.

Referring now to FIG. 3, the application program 58 associated with the module 14e may work in conjunction with firmware of the microcontroller 46 to, at a first step 66, synchronize the module 14 with the phone 10 upon installation of the module 14e. The synchronization confirms communication through electrical connector 40 and the communication protocol circuit 44 between the main processor 52 and the microcontroller 46 and establishes, for example, expected current draw by the module 14e and links it to an application program 58. The synchronization may be performed over wireless communication protocols such as Bluetooth. Optionally, if the module 14 was detached or disconnected from the smart phone 10, the module 14 may still be able to communicate wirelessly with the smart phone 10 and with the application program 58.

Prior to operation of the module 14, the application program 58 may query the main processer 52 to determine if accessibility restrictions have been enabled on the phone 10, for example, the phone is in "child mode". If restrictions are enabled, the application program 58 prevents further operation, or restricts certain sub-operations, of the application program 58 and module 14.

Alternatively, the application program 58 may prompt the user to confirm their age or date of birth to determine certain age restrictions placed on usage of the application program and/or module 14. Once the user's age is confirmed, their identifying information may be saved so that the user does not need to re-verify their age or date of birth every time they open the application program 58 or synchronize the module 14 with the phone 10. However, the user's identity may be re-confirmed by a passcode or biometric identifier, such as a finger print scan, voice or facial recognition to ensure that the user is authorized to use the module 14.

Upon completion of the synchronization process, at a process block 68, the user is prompted to identify the e-liquid 30 in the mouthpiece/heater tank 22, for example, by typing in a brand name and type or by scanning the identifier 53 in the case of preloaded mouthpiece/heater tanks 22.

The identified brand may then be applied to an internal lookup table, or an external table accessed through the Internet by the cell phone 10, to identify the concentration of nicotine and other materials in the e-liquid 30.

At decision block 70, application program 58 may wait for a command from the user to generate e-cigarette vapor by activating the heater coil 32. This command, for example, may be provided to the touch screen or through the button 18 being pressed by the user. In some embodiments, a personal identification number must be entered before activation of the e-cigarette. Once the command is generated, at process block 72 the heater coil 32 may be activated for a predetermined period of time or a time based on the length of time that the button 18 is pressed. The relationship between button pressing and the amount of heater activation may be controlled by a heater power setting previously entered by the user as indicated by input block 75, for example, in a set up of the application. Thus, for example, the heater activation may be limited to a predetermined time or power and may be controlled in increments (for example, a low and high dose) according to the time that the button 18 is pressed. Alternatively or in addition, knowledge of the nicotine concentration of the e-liquid 30 may be used to adjust the activation time based on a setting by the user made at input block 75 thus providing a particular dosage of nicotine adjusted for different nicotine concentrations of different e-liquids 30. Generally, activation of heater at decision block 70 may be controlled by the user to slowly limit the amount of use over time to assist the user in moderating or quitting, for example, according the entered desired usage goal 96.

The same dosage tracking mechanism may be used to track total usage of e-liquid 30 which will be logged as described below and which may also be used to detect that the mouthpiece/heater tank is nearing empty to prevent "dry firing" of the heater coil 32 such as can produce harsh or noxious flavors. A battery charge state may also be tracked in order to determine when the battery is nearing empty, or the battery source is disconnected, so that the heater coil 32 is not operated during low battery or no power source conditions.

After each activation of the heater coil 32, at decision block 74 the remaining capacity of the mouthpiece/heater tank 22 is updated and a determination is made as to whether the user has stopped using the mouthpiece/heater tank 22, for example, by indicating the same by a control on the touch screen 16 presented by the application program 58 or the expiration of a predetermined time interval indicating that the user is no longer using the e-cigarette feature. If the capacity of the mouthpiece/heater tank 22 is close to being fully consumed, the user may be locked out to prevent undesirable "dry firing" and provided with an indication that a new mouthpiece/heater tank 22 must be installed. Additional monitoring can be performed of the cell phone battery to ensure that fundamental cell phone capabilities are not inadvertently disabled through excess battery usage. An indication to the user and the lockout feature may be provided if the battery is close to being exhausted.

At this time the program proceeds to process block 76 and usage is logged by tallying up the total amount of e-liquid 30 consumed and/or the total amount of nicotine in that e-liquid together with a date and time. This logging information may be combined, for example, on a daily basis together with a separate indication of how many cigarettes the user has smoked as entered separately by the user through the touch screen 16 or the like as indicated by process block 80.

After this logging or at any time during the use of the e-cigarette, the user may also provide comments with respect to their use as indicated by process block 82. For example, these comments may be entered as text commenting on the user's experience using particular e-liquid 30, for example, indicating how effective the e-liquid 30 was with respect to satisfying their nicotine craving or other notes with respect to the process. This information may also be logged in a diary form for later access by the user. At the conclusion of the logging process or any time after activation of the heater coil 32 information may be broadcast as indicated by process block 84 to other users and/or support groups or consumers of e-liquid 30.

Figure 4:
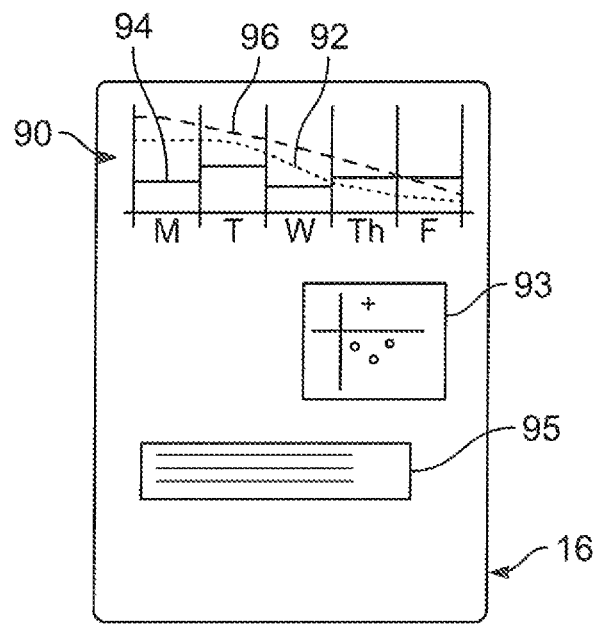
FIG. 4 is a screenshot of the cell phone showing output from the application program of FIG. 3.

Referring now to FIG. 4, information collected during the use of the e-cigarette may be presented to the user in a variety of forms including a graph 90 providing a horizontal time axis, for example, indicating different days of the week and a vertical axis indicating respectively cigarette usage 92, e-cigarette usage 94, and, for example, a desired usage goal 96 entered by the user, for example, at input block 75 as part of the set up of the application program. In this way the user can have positive reinforcement and regular tracking of their success in reducing cigarette and nicotine consumption. The invention further contemplates that the user's progress may be incentivized for example using an achievement based system, merit badges that the user can share on their social networks or a game or the like.

In one version, the screen 16 may also present a map display 93, for example, showing other users in the vicinity who are using comparable e-cigarettes thus enabling the user to seek out additional support or company. Alternatively or in addition, the map display 93 may show places where the user can buy new e-cigarette materials such as mouthpiece/heater tanks 22. Comments by other users or the user may be presented in a text box 95 which may also be uploaded, for example, to the user's website such as Facebook or Yelp or the like or other interest group website. These comments may allow the user to build a community of other individuals seeking to cease smoking and provide reviews or comments, on particular e-liquids and the like.

Figure 5:
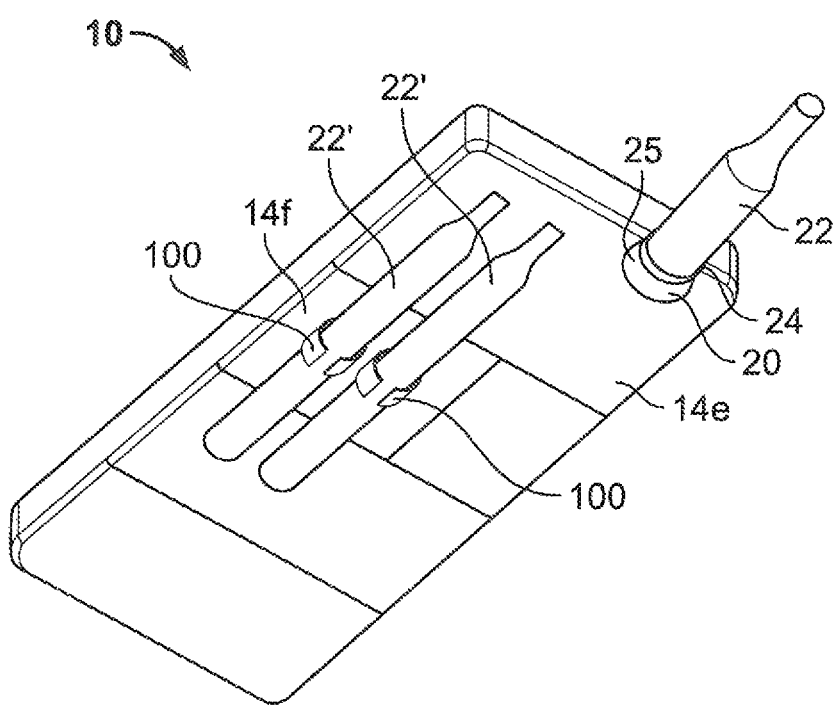
FIG. 5 is a figure similar to that of FIG. 1 showing an alternative orientation of the attachment of the mouthpiece/heater tank to the e-cigarette module and holder clips incorporated into a separate module for bolding additional mouthpiece/heater tanks.

Referring now to FIG. 5, it will be appreciated that the mouthpiece/heater tank 22 may alternatively be oriented to extend generally parallel to a plane of the back surface of the phone 10, for example aligned with the long axis of the cell phone 10, or may in fact be attached to the e-cigarette module 14e through a swivel coupling 25 holding the interface socket 20 that permits the orientation of the mouthpiece/heater tank 22 to be freely changed. Specifically, the swivel coupling 25 allows the angle of the interface socket 20 to be adjusted through a range of approximately 90 degrees or more mechanically while allowing uninterrupted electrical communication between the e-cigarette module 14e and the interface socket 20. A decent system may provide for stops at multiple locations or a friction clutch may provide for an arbitrary positioning of the swivel coupling 25 with the angle being retained at its last position. In addition, mounting clips 100 may be attached to another module (for example a storage module 141) to hold additional mouthpiece/heater tanks 22' conveniently with the phone 10.

Figure 6:
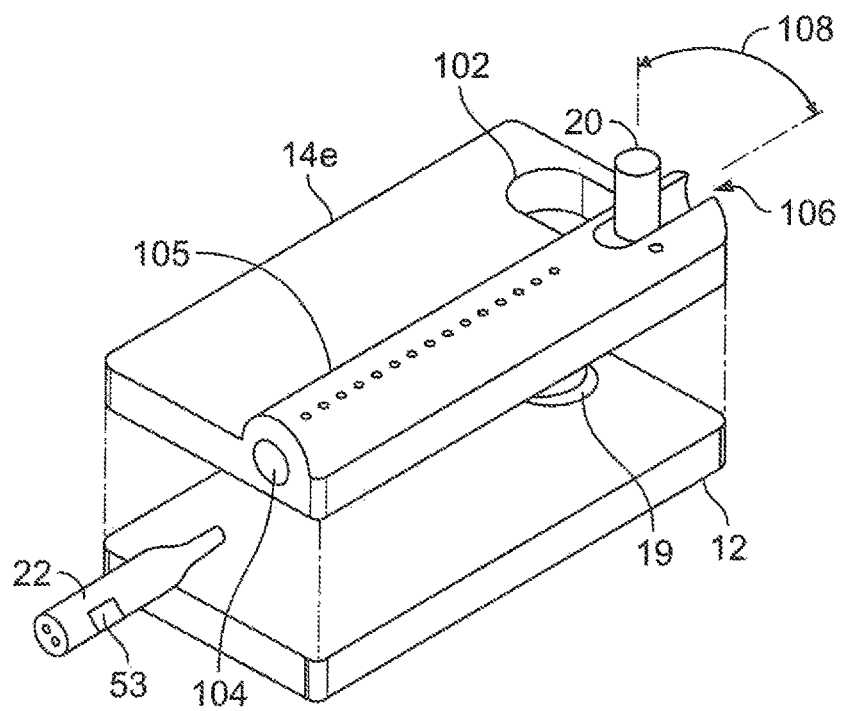
FIG. 6 is a perspective view of a cell phone showing an alternative embodiment of the e-cigarette module being releasably interconnected to the rear of the cell phone and a pivotable attachment of the mouthpiece/heater tank to the e-cigarette module.

Referring now to FIG. 6, in a form factor similar to that provided by the Moto-Z phone, an e-cigarette module 14e may cover the entire back of the frame 12, with the frame supporting a camera 19 visible through an aperture 102 in the e-cigarette module 14e. In this case a portion 105 of the e-cigarette module 14e extending along the length of the e-cigarette module 14e may be thickened to provide for a receiving pocket 104 that may fully receive a heater tank 22 within the e-cigarette module 14e. The receiving pocket 104 may hold the heater tank 22 when not in use, or a supplemental heater tank 22, for example, to store a different flavor of e-liquid. This thickened portion 105 may partially encase the swivel coupling 106 supporting the interface socket 20 while allowing movement through an angular range 108. Before use of the heater tank 22 a QR code 53 may be scanned using the camera 19 to identify the heater tank 22 to the phone for the purpose of providing functionality described above.

It is understood that the module 14 may be adapted to be used with other applications in the medical or recreational industries that also require the vaporization of liquids and is not limited to any particular aerosol, e-liquid or vapor. For example, the module may accommodate the vaporization and inhalation of medications (e.g., for treatment of asthma), vitamins (e.g., vitamin B12), aromatherapy oils, and hash oils.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made dear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in, a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It will be appreciated that part of the application program 58 may also be executed by the microcontroller 46.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A modular smart phone component providing vaporization functionality configured to electrically interconnect with a smart phone, comprising:
   a module having an exposed surface opposite a coupling surface, the coupling surface releasably interconnecting with a broadest surface of the smart phone extending generally along a plane;

an interface socket providing electrical interconnection to a heater tank with a heater coil for heating a liquid for vaporization and enclosed by a replaceable mouthpiece extending along a mouthpiece axis wherein the interface socket permits a swivel range of the mouthpiece axis within a range extending between the plane of the broadest surface of the smart phone and perpendicular to the plane of the broadest surface of the smart phone; and a microcontroller executing a stored program stored in memory to:
communicate with a processor of the smart phone; and
control electric power delivered from the smart phone to the heater coil.

2. The modular smart phone component of claim 1 wherein the interface socket is a threaded mechanical connection containing a two-terminal electrical connection.

3. The modular smart phone component of claim 1 wherein the interface socket may be swiveled through a range of approximately 90 degrees or more.

4. The modular smart phone component of claim 1 wherein the module is interconnected to the smart phone through a magnetic coupling.

5. The modular smart phone component of claim 1 wherein dimensions of the module are commensurate with the dimensions of a broadest surface of a standard smart phone.

6. The modular smart phone component of claim 1 wherein the interface socket is on a same plane as a camera lens and the module provides an opening allowing the camera lens to extend through the opening.

7. The modular smart phone component of claim 1 further comprising a built in battery providing an independent power source separate from a power source of the smart phone.

8. The modular smart phone component of claim 1 further comprising a sensor adapted to detect an identification of the liquid within the heater tank.

9. The modular smart phone component of claim 8 wherein the sensor is a camera adapted to detect a machine-readable optical label.

10. The modular smartphone component of claim 8 wherein the sensor is a detector capable of detecting a resistor element embedded in the heater tank/mouth piece.

11. The modular smart phone component of claim 1 wherein the microcontroller communicates with a processor of the smart phone where the processor manages distribution of electrical power from the smart phone to the heater modular smart phone component.

12. The modular smart phone component of claim 1 wherein the microcontroller communicates with the processor of the smart phone wirelessly.

13. The modular smart phone component of claim 1 further comprising a virtual activation button on a screen of the smart phone delivering a signal to the microcontroller for activating power delivery to the heater coil.

14. A method of operating a modular vaporizer component using a module a module having an exposed surface opposite a coupling surface, the coupling surface releasably interconnecting with a broadest surface of the smart phone extending generally along a plane;
an interface socket coupled to the module providing electrical interconnection to a heater tank with a heater coil and holding a liquid for vaporization and enclosed by a replaceable mouthpiece extending along a mouthpiece axis wherein the interface socket permits a swivel range of the mouthpiece axis within a range extending between the plane of the broadest surface of the smart phone and perpendicular to the plane of the broadest surface of the smart phone;
and a microcontroller executing a stored program stored in memory to receive an activation signal and to control electric power delivered to the heater coil in response to the activation signal, and comprising the steps of:
electrically interconnecting the heater tank to the interface socket of the modular smart phone component;
operating an application program of the modular smart phone component stored in a memory to:
synchronize wireless communication between the modular smart phone component and the smart phone; and
activate the heater coil for a duration of time.

15. The method of claim 14 further operating the application program to: receive an identification of the liquid within the heater tank.

16. The method of claim 14 further operating the application program to: detect when the heater tank is nearly empty, the battery is nearly empty, or the battery is disconnected to stop further activation of the heater coil.

17. The method of claim 14 further operating the application program to: track total time of activation of the heater coil or total amount of liquid consumed.

18. The method of claim 17 further operating the application program to: produce a graphical representation of track total time of activation of the heater coil or total amount of liquid consumed over time and display the graphical representation on a screen of the smart phone.

19. The method of claim 17 wherein the duration of time the heater coil is activated is predetermined and limited over time.

20. The method of claim 13 further operating the application program to: receive location data from the smart phone and link the application program to nearby shops and venues using the location data.

21. The method of claim 13 further operating the application program to: receive an authorization level of a user and prevent operation of the heater coil if the authorization level does not permit operation of the modular vaporizer component.

22. The method of claim 21 further operating the application program to: receive an identification of the user through a biometric sensor.

* * * * *